UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

PROCESS OF MAKING CONDENSATION PRODUCTS OF PHENOLS AND FORMALDEHYDE.

1,187,229.   Specification of Letters Patent.   Patented June 13, 1916.

No Drawing.   Application filed October 2, 1909.   Serial No. 520,675.

*To all whom it may concern:*

Be it known that I, LEO H. BAEKELAND, a citizen of the United States, residing at Yonkers, in the county of Westchester and State of New York, have invented certain new and useful Improvements in Processes of Making Condensation Products of Phenols and Formaldehyde, of which the following is a specification.

In my copending application relating to the manufacture and utilization of insoluble, infusible condensation products of phenols and formaldehyde, (Patent No. 942,809, patented Dec. 7, 1909), I have described the advantages of alkalis or bases, for example ammonia, caustic, alkalis, or the like, as condensing agents, if used in small amounts. I have indicated also that larger amounts of these bodies act detrimentally. I have found, however, that it is possible to use larger amounts of alkalis or bases than those recommended by me, provided the excess thereof be eliminated or neutralized before the incomplete products of condensation are submitted to the final heating process which is to transform them into the final hardest insoluble infusible condensation products. This procedure allows the first phase of the reaction to be considerably shortened, and assures a more complete combination between the reacting bodies. For instance, quantities of sodium hydroxid as high or higher than one molecule for each molecule of phenolic body may be used, to which is added the required amount of formaldehyde, the latter being used in about molecular proportions, *i. e.,* about one molecule of $CH_2O$ for each molecule of the phenolic body or better an amount of $CH_2O$ decidedly in excess of this proportion. Under certain conditions specially as described below, when a small amount of the base or alkali is left uneliminated, it is possible to obtain passable results with quantities of $CH_2O$ somewhat less than molecular proportions.

The addition of alkali or base can be made directly to the mixture of the phenolic body and formaldehyde, or separately or to any of the constituents of this mixture, but it is preferable and more logical to add it to the phenolic body so as to transform the latter wholly or partially into phenolate, then to add the formaldehyde and then let the reaction proceed. This is hastened by heating or boiling and the operation can be conveniently carried out in a return condenser. After the reaction is finished, a suitable acid is added so as to neutralize the disturbing excess of alkali or base. Sulfuric acid or hydrochloric acid diluted to any convenient degree with water are very appropriate for this. This addition of the acid causes precipitation of the partial reaction products of phenols and formaldehyde.

According to the amount of formaldehyde used, the temperature or the concentration of the liquids, the products precipitated by this treatment will be viscous, pasty, solid or pulverulent. Not only strong acids, but also weak acids for instance carbonic acid may be used for this purpose. In the same way, acid salts, for instance, acid sulfate of sodium can be used. Or again, soluble metallic salts of the heavier metals of which the hydroxids are insoluble and precipitable by alkaline hydroxids, can be used, and thus effect by double decomposition, the elimination of the excess of alkaline hydroxids; for instance: salts of aluminum, zinc, copper, iron, lead, nickel, cobalt, etc., will answer this purpose. However, these salts not only precipitate the partial condensation products, but at the same time form insoluble metallic combinations; in certain cases, the latter present the advantage of thus forming appropriate filling materials, which alone or in addition to other suitable fillers, may improve the appearance or physical properties of the final product or facilitate its technical manufacture.

As an illustrative example of the invention, 100 grams of phenol are dissolved in an aqueous solution containing 50 grams of caustic soda, and 100 cubic centimeters of commercial 40% formaldehyde are added to the mixture. The mixture is then heated to boiling, and after the reaction has taken place, as indicated by the formation of initial products of condensation, neutralizing agents are added in proportion to eliminate the undesired excess of the basic condensing agent. Preferably the neutralizing agent will be added in proportion sufficient to reduce the basic condensing agent to one-fifth or less of the equimolecular proportion of the phenolic body used, as specified in the prior patent above referred to. In case the neutralizing agent is a salt capable of yielding a precipitate with the basic condensing agent, as above described, this precipitate may serve alone or in conjunction with suitable filling materials as an inert addition to modify the properties of the product. My process can likewise be carried out in an indirect way by successive treatment. For instance, by restricting the amount of $CH_2O$, and by operating in presence of acid condensing agents, I may first produce condensation products of phenols and formaldehyde which are fusible and soluble and which do not change into insoluble infusible condensation products if they be submitted to the combined action of heat and pressure. And these soluble fusible condensation products can be dissolved in alkaline solutions and made to react upon more formaldehyde, then submitted afterward to the treatment with acids or salts as described above, which will set free condensation products which can be transformed into insoluble infusible products under the influence of heat and pressure.

In whatever way the partial condensation products have been made or precipitated, washing with water or decantation will remove the majority or totality of water soluble products which are formed at the same time. The partial condensation product can now be dried or otherwise freed from any remaining water which might impede any future treatment. The partial reaction products as obtained above, duly freed of all disturbing excess of alkalis or bases, can now be transformed in the final hard, insoluble, infusible, condensation product. This transformation may be accomplished by the aid of heat alone, or under the combined action of heat and pressure, as described in my prior patents and publications. (See, for example, U. S. Patents 942,699 and 942,700, patented December 7, 1909; Baekeland, "*Journal of Industrial and Engineering Chemistry*," vol. 1, No. 3, March 1909; etc.) Before resorting to this final treatment, the substance can be mixed or incorporated with other materials which may act as fillers; for instance organic or inorganic fibrous or cellular materials or other organic or inorganic filling materials, the addition of which may be desirable in order to increase the technical qualities of the final products or articles made thereof, or to facilitate the operation of molding or shaping. These filling materials can be incorporated at any time before or during the final application of heat and pressure. For instance, they may be added to the initial chemicals, or to their mixture, before, during or after the first reaction has taken place, or before, during, or after the acids or salts are added.

In all the above operations, the acids or salts are preferably added in such a proportion that only a small portion of the base or alkali is left in the mixture. This small amount left purposely in the mass, may considerably facilitate all future final operations of hardening under the action of heat, or the combined action of heat and pressure. This relatively small residual proportion of base so controls or directs the reaction that there results a phenolic condensation product which is of the infusible type, even if the reacting proportions of phenol and formaldehyde or their equivalents are varied considerably from those above mentioned as preferable. If on the other hand, the alkali is completely neutralized, or the mass rendered slightly acid, the reaction is apt to take quite another course, so that the phenolic condensation product ultimately obtained is of the permanently soluble and fusible type.

In the above described processes, formaldehyde can be replaced by its polymers, or by other substances which can generate formaldehyde, or are equivalent thereto in this reaction, by reason of their containing a mobile methylene group.

I am aware that mixtures of phenols and formaldehyde have been used heretofore, in presence of molecular amounts of alkalis as condensing agents, but these processes aim at the final production of soluble, fusible resinous condensation products, very different physically and chemically, from the insoluble, infusible, condensation products produced by my process.

By the term "phenols" I desire to designate not only the first member of the group, but also all its homologues or other phenolic bodies, or mixtures of these different products.

The term "neutralizing" is employed herein to cover any method whereby the undesired excess of basic condensing agent is eliminated or rendered inert as regards its effect upon the chemical character of the condensation product, whether by direct neutralization, by precipitation in insoluble form, or otherwise.

The expression "eliminating the undesired excess of base by admixing a reagent yielding therewith an insoluble compound" as employed in claims 3 and 4, and similar expressions in claims 5 and 6, are intended to cover the precipitation of all of the base or of any desired proportion thereof.

I claim:—

1. A process of producing compact, coherent bodies containing an infusible phenolic condensation product and a basic substance, which consists in preparing a mixture of a phenolic body, a substance containing a mobile methylene group and a base, said base being in excess of the proportion desired in the final product, then eliminating a portion only of the base, and hardening the mass containing the residual base into compact and coherent form, said residual base being in properly limited proportion to yield, in conjunction with the other components, a phenolic condensation product of the infusible type.

2. A process of producing compact, coherent bodies containing an infusible phenolic condensation product and a basic substance, which consists in preparing a mixture of a phenolic body, a substance containing a mobile methylene group and a base, said base being in excess of the proportion desired in the final product, then eliminating a portion only of the base, and hardening the mass containing the residual base into compact and coherent form by the application of heat and pressure, said residual base being in properly limited proportion to yield, in conjunction with the other components, a phenolic condensation product of the infusible type.

3. A process of producing compact, coherent bodies containing an infusible phenolic condensation product and a basic substance, which consists in preparing a mixture of a phenolic body, a substance containing a mobile methylene group and a base, said base being in excess of the proportion desired in the final product, then eliminating the undesired excess of base by admixing a reagent yielding therewith an insoluble compound, and hardening the mass into compact and coherent form.

4. A process of producing compact, coherent bodies containing an infusible phenolic condensation product and a basic substance, which consists in preparing a mixture of a phenolic body, a substance containing a mobile methylene group and a base, said base being in excess of the proportion desired in the final product, then eliminating the undesired excess of base by admixing a reagent yielding therewith in insoluble compound, and hardening the mass containing the residual base into compact and coherent form, said residual base being in properly limited proportion to yield, in conjunction with the other components a phenolic condensation product of the infusible type.

5. A process of producing compact, coherent bodies containing insoluble, infusible condensation products of phenols and formaldehyde, which consists in adding to a mixture of phenols and formaldehyde, a basic condensing agent in excess of the proportion desired in the final product, thereby accelerating the earlier stages of the reaction, then eliminating the undesired excess of basic condensing agent by admixing a reagent yielding therewith an insoluble compound, and hardening the mass into compact and coherent form.

6. A process of producing compact, coherent bodies containing insoluble, infusible condensation products of phenols and formaldehyde, which consists in adding to a mixture of phenols and formaldehyde, a basic condensing agent in excess of the proportion desired in the final product, thereby accelerating the earlier stages of the reaction, then eliminating the undesired excess of basic condensing agent by admixing a reagent yielding therewith an insoluble compound, and hardening the mass into compact and coherent form by the application of heat and pressure.

In testimony whereof, I affix my signature in presence of two witnesses.

LEO H. BAEKELAND.

Witnesses:
 H. S. TARBELL,
 MARY L. SHORT.